United States Patent
Honda et al.

(10) Patent No.: US 11,041,505 B2
(45) Date of Patent: Jun. 22, 2021

(54) ROTARY MACHINE BLADE, SUPERCHARGER, AND METHOD FOR FORMING FLOW FIELD OF SAME

(71) Applicant: MITSUBISHI HEAVY INDUSTRIES ENGINE & TURBOCHARGER, LTD., Sagamihara (JP)

(72) Inventors: Hironori Honda, Tokyo (JP); Seiichi Ibaraki, Tokyo (JP); Kenichiro Iwakiri, Tokyo (JP); Tadashi Kanzaka, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 226 days.

(21) Appl. No.: 16/082,191

(22) PCT Filed: Mar. 31, 2016

(86) PCT No.: PCT/JP2016/061641
§ 371 (c)(1),
(2) Date: Sep. 4, 2018

(87) PCT Pub. No.: WO2017/168766
PCT Pub. Date: Oct. 5, 2017

(65) Prior Publication Data
US 2020/0088210 A1  Mar. 19, 2020

(51) Int. Cl.
*F04D 29/28* (2006.01)
*F02C 6/12* (2006.01)
*F02B 37/00* (2006.01)
*F04D 29/32* (2006.01)

(52) U.S. Cl.
CPC .............. *F04D 29/284* (2013.01); *F02C 6/12* (2013.01); *F02B 37/00* (2013.01); *F04D 29/324* (2013.01);
(Continued)

(58) Field of Classification Search
CPC ...... F04D 29/28; F04D 29/281; F04D 29/282; F04D 29/284; F04D 29/324; F02C 6/12;
(Continued)

(56) References Cited

U.S. PATENT DOCUMENTS

| 8,096,777 B2 | 1/2012 | Yokoyama et al. |
| 9,897,101 B2* | 2/2018 | Saito ........................ F04D 29/30 |

(Continued)

FOREIGN PATENT DOCUMENTS

| CH | 351065 A | 12/1960 |
| CN | 101910565 A | 1/2009 |

(Continued)

OTHER PUBLICATIONS

Machine translation of DE 102014003123 A1, Retrieved from ESPACENET on Jun. 7, 2020 (Year: 2020).*

(Continued)

*Primary Examiner* — Courtney D Heinle
*Assistant Examiner* — Sang K Kim
(74) *Attorney, Agent, or Firm* — Birch, Stewart, Kolasch & Birch, LLP

(57) ABSTRACT

A rotary machine blade (31) equipped with a clearance flow suppression blade section (34), the lean angle of which has one or more inflection points, and which is formed such that when the direction from a positive-pressure surface (31a) to a negative-pressure surface (31b) is taken as the normal direction, an inflection point (P1) of the lean angle positioned farthest toward the blade end (33) changes from the negative to the positive direction in the direction away from the blade end (33).

13 Claims, 7 Drawing Sheets

(52) U.S. Cl.
CPC .... *F05D 2220/40* (2013.01); *F05D 2240/303* (2013.01); *F05D 2240/304* (2013.01); *F05D 2250/51* (2013.01); *F05D 2250/70* (2013.01)

(58) Field of Classification Search
CPC ................ F02B 37/00; F05D 2220/40; F05D 2240/304; F05D 2250/51; F05D 2250/70
See application file for complete search history.

(56) References Cited

U.S. PATENT DOCUMENTS

| | | | |
|---|---|---|---|
| 2008/0279692 | A1 | 11/2008 | Karamavruc et al. |
| 2010/0098548 | A1 | 4/2010 | Yokoyama et al. |
| 2010/0298924 | A1 | 11/2010 | Boning et al. |
| 2013/0309082 | A1 | 11/2013 | Sugimura et al. |
| 2015/0159670 | A1* | 6/2015 | Saito ..................... F04D 17/122 415/206 |
| 2015/0218949 | A1 | 8/2015 | Higashimori |
| 2016/0061216 | A1 | 3/2016 | Duong et al. |
| 2016/0076551 | A1* | 3/2016 | Saito ..................... F04D 29/245 415/206 |

FOREIGN PATENT DOCUMENTS

| | | | | |
|---|---|---|---|---|
| CN | 101910565 | A | 12/2010 | |
| DE | 10 2008 020 673 | A1 | 11/2008 | |
| DE | 102014003123 | A1 * | 9/2015 | ............ F04D 29/30 |
| EP | 2 055 893 | A1 | 5/2009 | |
| JP | 2008-128064 | A | 6/2008 | |
| JP | 4178545 | B2 | 9/2008 | |
| JP | 5608062 | B2 | 9/2014 | |
| JP | 2015-31219 | A | 2/2015 | |
| JP | 5762641 | B2 | 6/2015 | |
| WO | WO 2009/086959 | A1 | 7/2009 | |
| WO | WO 2016/035329 | A1 | 3/2016 | |

OTHER PUBLICATIONS

International Search Report dated May 24, 2016 issued in PCT Application No. PCT/JP2016/061641 with an English Translation.
Written Opinion dated May 24, 2016 issued in PCT Application No. PCT/JP2016/061641 with an English Translation.

* cited by examiner

ROTARY MACHINE BLADE, SUPERCHARGER, AND METHOD FOR FORMING FLOW FIELD OF SAME

TECHNICAL FIELD

The present invention relates to a rotary machine blade, a turbocharger, and a method for forming a flow field of the rotary machine blade and the turbocharger.

BACKGROUND ART

It is known that the performance of a rotary machine, such as a compressor and a turbine, decreases due to a clearance flow flowing through a gap between a rotor blade and a casing. In many cases, the clearance flow is generated, for example, due to a differential pressure between a negative pressure surface and a positive pressure surface. Since the clearance flow flows through a gap for the rotor blade to rotate, the differential pressure cannot be set to zero. For this reason, it is desirable to reduce a clearance flow as much as possible.

An axial turbine provided with a plate for reducing a leakage flow vortex on a tip of the rotor blade such that a chord is formed on a curved ventral blade surface in order to reduce a leakage vortex caused by a tip clearance of the rotor blade is disclosed in PTL 1.

CITATION LIST

Patent Literature

[PTL 1] Japanese Patent No. 4178545

SUMMARY OF INVENTION

Technical Problem

The plate for reducing a leakage flow vortex formed in the rotor blade of PTL 1 changes the circumferential shape of the tip of the rotor blade. For this reason, since a throat area reduces, there is a possibility that the performance of the rotor blade decreases or a loss increases.

An object of the invention is to provide a rotary machine blade, a turbocharger, and a method for forming a flow field of the rotary machine blade and the turbocharger, which allow efficiently reducing a clearance flow without a decrease in performance or an increase in a loss.

Solution to Problem

According to a first aspect of the invention, there is provided a rotary machine blade including a clearance flow suppressing blade portion that is formed such that a lean angle has one or more inflection points, and the inflection point of the lean angle, which is located closest to a blade end, turns over from negative to positive in a direction of separating apart from the blade end when a direction from a positive pressure surface to a negative pressure surface is set as a positive direction.

A secondary flow can be directed to flow in a direction where a clearance flow between the blade end and a shroud is reduced without changing the circumferential shape of the blade by the clearance flow suppressing blade portion being included. As a result, the clearance flow can be efficiently reduced without a decrease in performance or an increase in a loss of the blade.

According to a second aspect of the invention, in the rotary machine blade, the inflection point of the lean angle, which is located closest to the blade end, may be formed at least in a region having a span height of 70% or more.

By configuring in such a manner, a secondary flow can be directed to flow in a direction of reducing a clearance flow in the region having a particularly increasing effect on a clearance flow, in which the span height is 70% or more. As a result, the clearance flow can be efficiently reduced.

According to a third aspect of the invention, in the rotary machine blade, the clearance flow suppressing blade portion of the first aspect may be formed in at least a part between a leading edge and a trailing edge of a blade.

By configuring in such a manner, a clearance flow in at least a part between the leading edge and the trailing edge of the blade can be reduced.

According to a fourth aspect of the invention, in the rotary machine blade, the clearance flow suppressing blade portion of the third aspect may be formed in a range of 0 to 40% from the leading edge to the trailing edge of the blade.

By configuring in such a manner, a clearance flow in a range of 0 to 40% from the leading edge to the trailing edge of the blade, in which the clearance flow particularly increases, can be reduced. As a result, the clearance flow can be efficiently reduced.

According to a fifth aspect of the invention, in the rotary machine blade of any one aspect of the first to fourth aspects, a curved portion where at least a part of the negative pressure surface is formed in a recessed shape may be further included.

While the performance of the blade is improved by the blade having a recessed shape due to the curved portion as described above, a decrease in performance or an increase in a loss can be suppressed by reducing a clearance flow at the blade end.

According to a sixth aspect of the invention, in the rotary machine blade according to any one aspect of the first to fourth aspects, the positive pressure surface or the negative pressure surface may be formed in a linear shape.

By configuring in such a manner, a clearance flow can be reduced even when the positive pressure surface or the negative pressure surface is in a linear shape.

According to a seventh aspect of the invention, there is provided a turbocharger including the rotary machine blade according to any one of the first to sixth aspects.

By configuring in such a manner, the performance of the turbocharger can be improved since a clearance flow can be reduced.

According to an eighth aspect of the invention, there is provided a rotary machine blade that forms a flow field where a secondary flow that flows in a vicinity of a negative pressure surface is directed to flow to a blade end along the negative pressure surface during rotation.

According to a ninth aspect of the invention, there is provided a method for forming a flow field of a rotary machine blade including forming a flow field where a secondary flow that flows in a vicinity of a negative pressure surface of the rotary machine blade is directed to flow to a blade end of the rotary machine blade along the negative pressure surface.

According to a tenth aspect of the invention, there is provided a method for forming a flow field of a turbocharger having a compressor wheel that has a disk formed in a disk shape and a plurality of blades formed at intervals in a circumferential direction of the disk, a compressor housing that accommodates the compressor wheel, a turbine wheel, and a turbine housing that accommodates the turbine wheel.

The method includes forming a flow field where a secondary flow induced in a vicinity of a negative pressure surface of each of the blades is directed to flow to a blade end of each of the blades along the negative pressure surface during rotation of the compressor wheel.

Advantageous Effects of Invention

In the rotary machine blade, a clearance flow can be efficiently reduced without a decrease in performance or an increase in a loss.

BRIEF DESCRIPTION OF DRAWINGS

FIG. 4 is a partially enlarged view of a vicinity of a blade end portion of FIG. 3.

DESCRIPTION OF EMBODIMENTS

First Embodiment

Next, a rotary machine blade, a turbocharger, and a method for forming a flow field of the rotary machine blade and the turbocharger according to a first embodiment of the invention will be described based on the drawings. The turbocharger of the embodiment is mounted on a vehicle such as an automobile having a reciprocating engine (hereinafter, simply referred to as an engine), which is an internal combustion engine, as a driving source. The turbocharger is a so-called turbocharger that uses exhaust gas from the engine to compress intake air.

Figure 1:
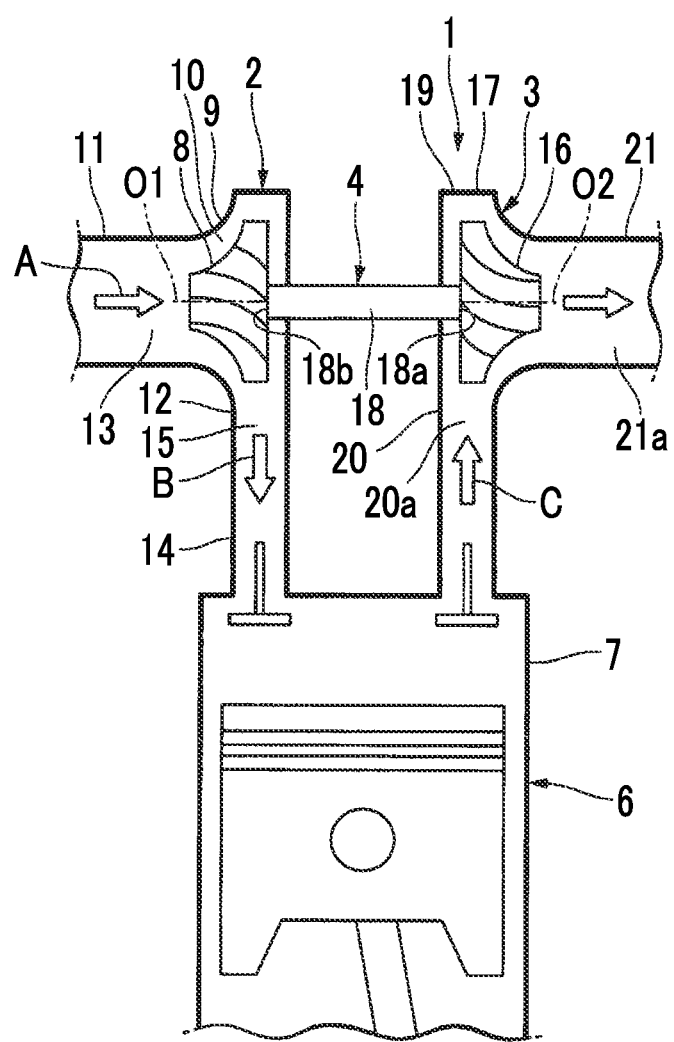
FIG. 1 is a view illustrating a schematic configuration of a turbocharger according to a first embodiment of the invention.
Figure 2:
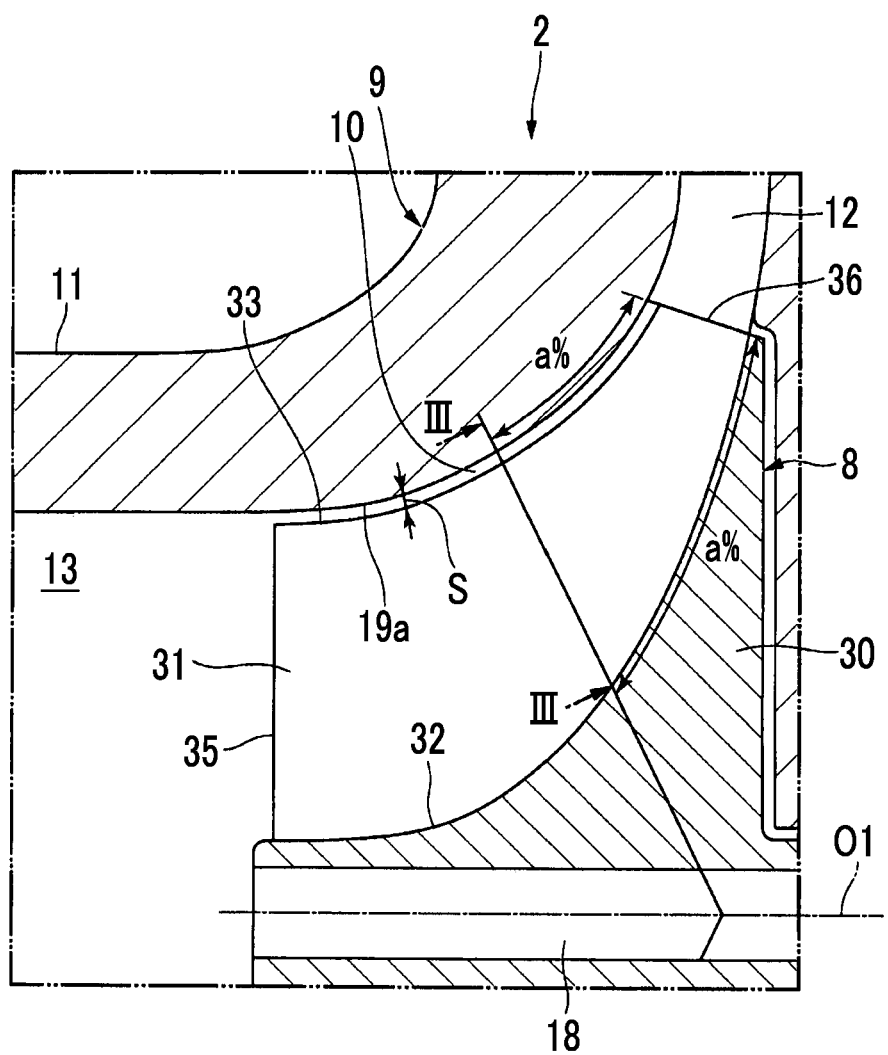
FIG. 2 is a meridian cross sectional view of a rotary machine pole according to the first embodiment of the invention.

FIG. 1 is a view illustrating a schematic configuration of the turbocharger according to the first embodiment of the invention. FIG. 2 is a meridian cross sectional view of a rotary machine pole according to the first embodiment of the invention.

As illustrated in FIG. 1, a turbocharger 1 includes a compressor 2, a turbine 3, and a bearing unit 4.

The compressor 2 compresses intake air introduced from an air cleaner (not illustrated) and feeds the compressed air to a cylinder 7 of an engine 6. The compressor 2 includes a compressor wheel 8 and a compressor housing 9.

The compressor wheel 8 rotates about an axis O1 thereof. The compressor wheel 8 compresses intake air A flowed in from an axis O1 direction while causing the intake air to flow from an inside to an outside in a radial direction about the axis by the centrifugal force. Compressed air B, which is obtained by the compressor wheel 8 compressing air, is discharged toward an outside of the compressor wheel 8 in the radial direction about the axis O1.

The compressor housing 9 includes a wheel accommodating unit 10, a compressor inlet 11, and a compressor outlet 12. The wheel accommodating unit 10 covers the compressor wheel 8 in a rotatable state from the outside. At a portion close to a rotation center of the compressor wheel 8, the compressor inlet 11 communicates with the wheel accommodating unit 10. The compressor inlet 11 forms a compressor inlet flow path 13 through which the intake air A is introduced into the wheel accommodating unit in the axis O1 direction. On the outside of the compressor wheel 8 in the radial direction, the compressor outlet 12 communicates with the wheel accommodating unit 10. The compressor outlet 12 is connected to an intake manifold 14 via a diffuser, a scroll flow path (not illustrated), or the like. The compressor outlet 12 forms a compressor outlet flow path 15 through which the compressed air B is introduced into the cylinder 7 of the engine 6 via the intake manifold 14.

The turbine 3 includes a turbine wheel 16 and a turbine housing 17.

The turbine wheel 16 absorbs some of heat energy of exhaust gas C discharged from the engine 6 and rotates about an axis O2 thereof.

The turbine housing 17 includes a turbine wheel accommodating unit 19, a turbine inlet 20, and a turbine outlet 21.

The turbine wheel accommodating unit 19 covers the turbine wheel 16 in a rotatable state from the outside.

The turbine inlet 20 forms a turbine inlet flow path 20a through which exhaust gas from the engine 6 is introduced into the turbine wheel accommodating unit 19. The turbine inlet 20 introduces exhaust gas into the turbine wheel accommodating unit 19 via a scroll (not illustrated).

On an outside of the turbine wheel 16 in the radial direction, the turbine wheel accommodating unit 19 communicates with the turbine inlet 20.

At a portion close to the rotation center of the compressor wheel 8, the turbine outlet 21 forms a turbine outlet flow path 21a communicating with the turbine wheel accommodating unit 19.

The bearing unit 4 includes a rotating shaft 18 and a bearing housing (not illustrated).

The rotating shaft 18 transmits the rotation of the turbine wheel 16 to the compressor wheel 8. The turbine wheel 16 is fixed to a first end portion 18a of the rotating shaft 18 and the compressor wheel 8 is fixed to a second end portion 18b of the rotating shaft.

Herein, the bearing housing (not illustrated) covers the rotating shaft 18 from the outside. The bearing housing has a bearing (not illustrated) that rotatably supports the rotating shaft 18. Each of the compressor housing 9 and the turbine housing 17 described above is fixed to the bearing housing.

Next, the airfoil shapes of the compressor wheel 8 and the turbine wheel 16 included in the turbocharger 1 described above will be described. For example, the airfoil shape can be used in both of the compressor wheel 8 and the turbine wheel 16 described above. For this reason, only the airfoil shape of the compressor wheel 8 will be described in the embodiment, and detailed description of the airfoil shape of the turbine wheel 16 will be omitted since the turbine wheel is different only in that a positive pressure surface and a negative pressure surface of a blade are on opposite sides in a rotation direction of the rotating shaft 18.

FIG. 2 is a cross sectional view taken along the axis of the compressor wheel according to the first embodiment of the invention.

As illustrated in FIG. 2, the compressor wheel 8 includes a disk 30 and blades 31.

The disk 30 is formed in a disk shape about the axis O1. More specifically, the disk 30 is formed such that a diameter thereof gradually increases in the radial direction about the axis O1 as becoming closer from one side (the left in FIG. 2) to the other side (the right in FIG. 2) of the rotating shaft 18 in the axis O1 direction.

The plurality of blades 31 are formed on a surface 32 facing one side of the disk 30 in the axis O1 direction and are formed at intervals in a circumferential direction of the axis O1. The blades 31 extend to be separated apart from the disk 30 and are radially disposed about the axis O1.

In addition, each of the blades 31 has a blade end portion 33 disposed with a little gap S between an inner peripheral surface 19a of the turbine wheel accommodating unit 19 and the blade end portion in a direction where the blades 31 extend. The blade end portion 33 is formed to be curved to the outside in the radial direction about the axis O1 as becoming closer from one side to the other side of the rotating shaft 18 in the axis O1 direction, as in the surface 32 of the disk 30. Herein, the gap S between the blade end portion 33 and the inner peripheral surface 19a is shown as a fixed blade end gap over an entire area in a direction where the blade end portion 33 extends for the sake of simplification.

Figure 3:
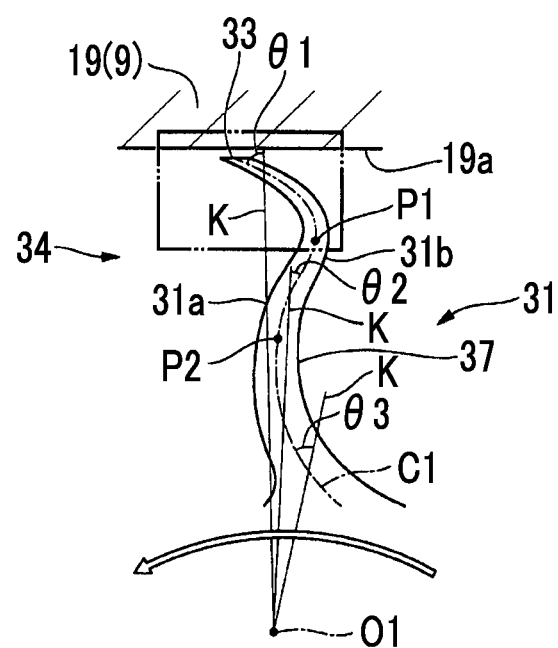
FIG. 3 is a cross sectional view of a blade taken along line III-III according to the embodiment of the invention.

FIG. 3 is a cross sectional view of the blade taken along line III-III according to the embodiment of the invention.

A cross section of the blade 31 illustrated in FIG. 3 is a cross section of the blade 31 obtained when the compressor wheel 8 is cut with a conical cross section formed by rotating a straight line, which connects a position of a % on a blade end portion 33 side in a length direction of a camber line and a position of a % on a surface 32 side of the disk 30 in the length direction of the camber line in FIG. 2 together, about the axis O1. Herein, "a" is any value of 0 to 100.

The blade 31 includes a clearance flow suppressing blade portion 34 that suppresses a clearance flow flowing from a positive pressure surface 31a to a negative pressure surface 31b of the blade 31 through the gap S described above. The clearance flow suppressing blade portion 34 of the embodiment is formed over an entire area in a flowing direction of a fluid from a leading edge 35 to a trailing edge 36 of the blade 31. In FIG. 3, a rotation direction of the compressor wheel 8 is shown with an outlined arrow.

The clearance flow suppressing blade portion 34 is formed such that a lean angle has one or more inflection points and a lean angle turns over from positive to negative when a direction from the positive pressure surface 31a to the negative pressure surface 31b of the blade 31 is set as a positive direction at an inflection point that is located closest to the blade end portion 33 side in the cross section of FIG. 3.

Herein, the lean angle is an angle formed between an imaginary straight line K extending from the axis O1 in the radial direction and the blade in the cross section of FIG. 3 described above. In other words, the lean angle is a tilt angle of the blade 31 with respect to the radial direction about the axis O1.

The clearance flow suppressing blade portion 34 of the embodiment is formed such that a lean angle of a camber line (shown with a one-dot chain line in FIG. 3) C1 of the blade 31 in the cross section of FIG. 3 has one or more inflection points and the lean angle turns over from positive to negative when the direction from the positive pressure surface 31a to the negative pressure surface 31b of the blade 31 is set as the positive direction at the inflection point that is located closest to the blade end portion 33 side.

A case where the blade 31 of the embodiment has two inflection points of the lean angle is given as an example. In FIG. 3, three lean angles θ1, θ2, and θ3 are given as examples. In addition, two inflection points P1 and P2 of the lean angle of the blade 31 are given as examples. At these points, the lean angles are 0 degree, for example, in a case of extending in the radial direction about the axis O1. That is, out of angles formed between the camber line C1 and the imaginary straight line K, the lean angle of the embodiment refers to an acute angle on the outside in the radial direction about the axis O1 with respect to an intersection point between the camber line C1 and the imaginary straight line K.

As illustrated in FIG. 3, the lean angle θ1 is a positive angle in a case where the direction from the positive pressure surface 31a to the negative pressure surface 31b is set as the positive direction. On the contrary, the lean angle θ2 is a negative angle. The positive and negative of the lean angle is reversed at the inflection point P1 which is in between a position of the lean angle θ1 and a position of the lean angle θ2. That is, the lean angle turns over from a positive angle to a negative angle as separating apart from the blade end portion 33.

In the embodiment, an absolute value of a positive lean angle gradually decreases to become zero at the inflection point P1 as becoming closer to the inflection point P1 from the blade end portion 33, which is on the outside in the radial direction about the axis O1. On the contrary, an absolute value of a negative lean angle gradually increases as becoming closer to the inside in the radial direction from the inflection point P1. An absolute value of a negative lean angle is the largest between the inflection point P1 and the inflection point P2. The lean angle θ2 described above is a lean angle in the vicinity of a position where the lean angle is the largest.

After then, contrary to the inflection point P1 described above, as approaching the inflection point P2, the absolute value of the negative lean angle decreases to become zero at the inflection point P2. After then, as becoming closer to the inside in the radial direction from the inflection point P2, the absolute value of the positive lean angle gradually increases. The lean angle θ3 described above is a lean angle on the inside of the inflection point P2 in the radial direction.

The blade 31 includes a curved portion 37 where the negative pressure surface 31b is formed in a recessed shape. In the cross section of FIG. 3, the curved portion 37 of the embodiment is curved in a recessed shape as the camber line C1 becoming closer to the negative pressure surface 31b side, and the blade 31 itself is curved. The curved portion 37 of the embodiment is formed on the inside of the inflection point P1, which is the inflection point located closest to the blade end portion 33 side, in the radial direction about the axis O1.

Next, effects of the clearance flow suppressing blade portion 34 described above will be described.

FIG. 4 is a partially enlarged view of the vicinity of the blade end portion of FIG. 3.

As illustrated in FIG. 4, the blade 31 is formed such that a region thereof near the blade end portion 33 tilts toward a positive pressure surface 31a side. For this reason, during the rotation of the compressor wheel 8, on the negative pressure surface 31b side of the blade 31, a secondary flow F2 that flows near the negative pressure surface 31b is likely to be directed toward the blade end portion 33 side along the negative pressure surface 31b. At this time, in a state where a direction of lift of the blade 31 is an obliquely upward direction, the lift has a radial component. In this state, the secondary flow F2 is likely to be directed to flow toward the outside in the radial direction. That is, the blade 31 forms a flow field where the secondary flow F2 that flows in the vicinity of the negative pressure surface 31b (in other words, induced in the vicinity of the negative pressure surface 31b) is directed to flow toward the blade end portion 33 side along the negative pressure surface 31b.

By the secondary flow F2 flowing toward the blade end portion 33 along the negative pressure surface 31b as described above, the secondary flow F2 includes a component against a flow of a clearance flow Fc and a component pushing into the outside in the radial direction. Therefore, the clearance flow Fc is reduced.

On the contrary, on the positive pressure surface 31a side, the positive pressure surface 31a faces an obliquely downward direction, that is, the inside in the radial direction about the axis O1. For this reason, a fluid colliding with the positive pressure surface 31a is likely to flow to the inside in the radial direction. Accordingly, the secondary flow F2 that tends to lift the positive pressure surface 31a toward the blade end portion 33 due to centrifugal force can be suppressed. For this reason, a fluid flowing into the gap S can be reduced. Also in FIG. 4, a direction where the compressor wheel 8 rotates is shown with an outlined arrow.

Therefore, according to the first embodiment described above, the secondary flow F2 can be directed to flow in a direction where the clearance flow Fc between the blade end portion 33 and the inner peripheral surface 19a is reduced without changing the circumferential shape of the blade 31 by the clearance flow suppressing blade portion 34 being included. As a result, the clearance flow Fc can be efficiently reduced without a decrease in performance or an increase in a loss of the blade 31.

While the performance of the blade 31 is improved by the curved portion 37 being curved such that the negative pressure surface 31b side has a recessed shape, a decrease in performance or an increase in a loss can be suppressed by reducing the clearance flow Fc at the blade end portion 33.

Modification Examples of First Embodiment

The shape of the clearance flow suppressing blade portion 34 is not limited to the shape of the first embodiment described above. Next, each of modification examples of the first embodiment described above will be described based on the drawings. In the description of each of the modification examples, the same portions as those of the first embodiment will be assigned with the same reference signs and overlapping description will be omitted.

First Modification Example

Figure 5:
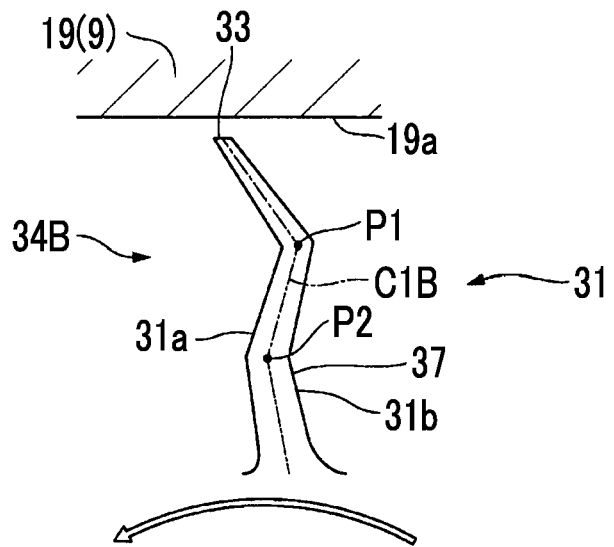
FIG. 5 is a cross sectional view equivalent to FIG. 3 according to a modification example of the first embodiment of the invention.

FIG. 5 is a cross sectional view equivalent to FIG. 3 according to a modification example of the first embodiment of the invention.

In the first embodiment described above, the clearance flow suppressing blade portion 34, in which the camber line C1 is formed in a curved shape having the inflection points P1 and P2, is given as an example. However, as illustrated in FIG. 5, the curved camber line C1 of the clearance flow suppressing blade portion 34 of the first embodiment may be replaced with a camber line C1B formed in a combination of straight lines. Also a clearance flow suppressing blade portion 34B is formed such that a lean angle turns over from negative to positive at the inflection point P1 located closest to the blade end portion 33 side.

Second Modification Example

Figure 6:
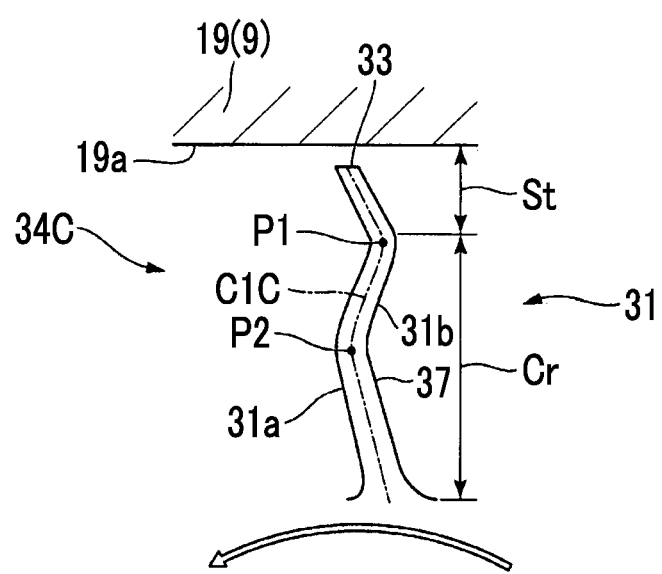
FIG. 6 is a cross sectional view equivalent to FIG. 3 according to a modification example of the first embodiment of the invention.

FIG. 6 is a cross sectional view equivalent to FIG. 3 according to a modification example of the first embodiment of the invention.

A case where the camber line C1B of the clearance flow suppressing blade portion 34B is configured in combination of the straight lines is described in the first modification example. However, as in a clearance flow suppressing blade portion 34C of the second modification example illustrated in FIG. 6, a combination of a straight line and a curved line may be adopted. The clearance flow suppressing blade portion 34C of the second modification example shows an example of a case where a camber line C1C close to the blade end portion 33 is formed by the straight line. In FIG. 6, a section of the straight line of the camber line C1C is indicated with "St", and a section of the curved line is indicated with "Cr".

Third and Fourth Modification Examples

Figure 7:
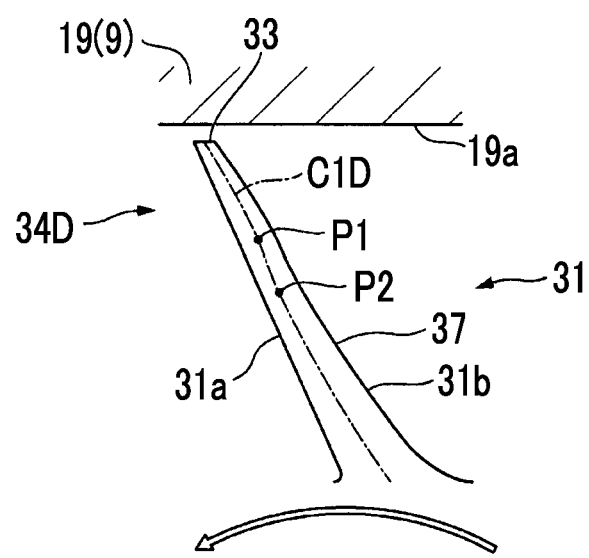
FIG. 7 is a cross sectional view equivalent to FIG. 3 according to a modification example of the first embodiment of the invention.
Figure 8:
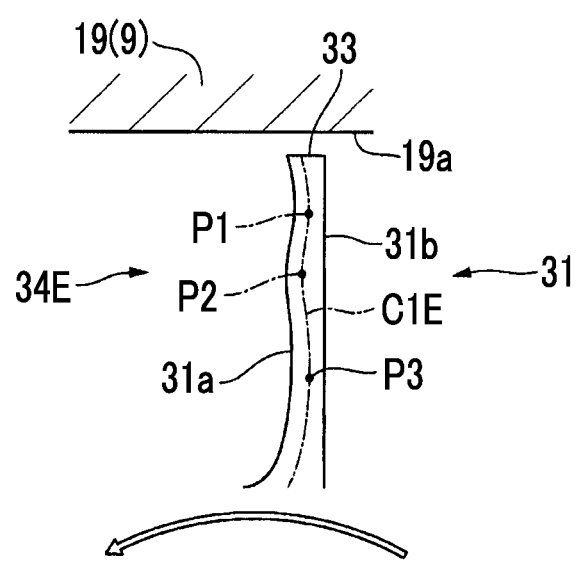
FIG. 8 is a cross sectional view equivalent to FIG. 3 according to a modification example of the first embodiment of the invention.

FIG. 7 is a cross sectional view equivalent to FIG. 3 according to a modification example of the first embodiment of the invention. FIG. 8 is a cross sectional view equivalent to FIG. 3 according to a modification example of the first embodiment of the invention.

A case where both of the positive pressure surface 31a and the negative pressure surface 31b are formed by curved lines is described in the first embodiment described above. However, as in a clearance flow suppressing blade portion 34D of a third modification example illustrated in FIG. 7, the positive pressure surface 31a may be formed by one straight line and only the negative pressure surface 31b may be formed by a curved line. Also the clearance flow suppressing blade portion 34D illustrated in FIG. 7 has two inflection points (P1 and P2 in FIG. 7) of a lean angle of a camber line C1D. The blade 31 of the third modification example illustrated in FIG. 7 is formed to be tilted as a whole such that the blade end portion 33 is located at the front in a rotation direction (shown with an outlined arrow in FIG. 7). Accordingly, the positive pressure surface 31a is tilted toward the front in the rotation direction.

Contrary to the third modification example, the negative pressure surface 31b may be formed in one straight line and only the positive pressure surface 31a may be formed by a curved line as in a clearance flow suppressing blade portion 34E of a fourth modification example illustrated in FIG. 8. Also the clearance flow suppressing blade portion 34E illustrated in FIG. 8 has three inflection points (P1 to P3 in FIG. 8) of a lean angle of a camber line C1E.

Second Embodiment

Next, a clearance flow suppressing blade portion according to a second embodiment of the invention will be described based on the drawings. The clearance flow suppressing blade portion of the second embodiment is different from that of the first embodiment only in that the clearance flow suppressing blade portion is formed in only a part of a blade. For this reason, the same portions as those of the first embodiment will be assigned with the same reference signs and overlapping description will be omitted.

Figure 9:
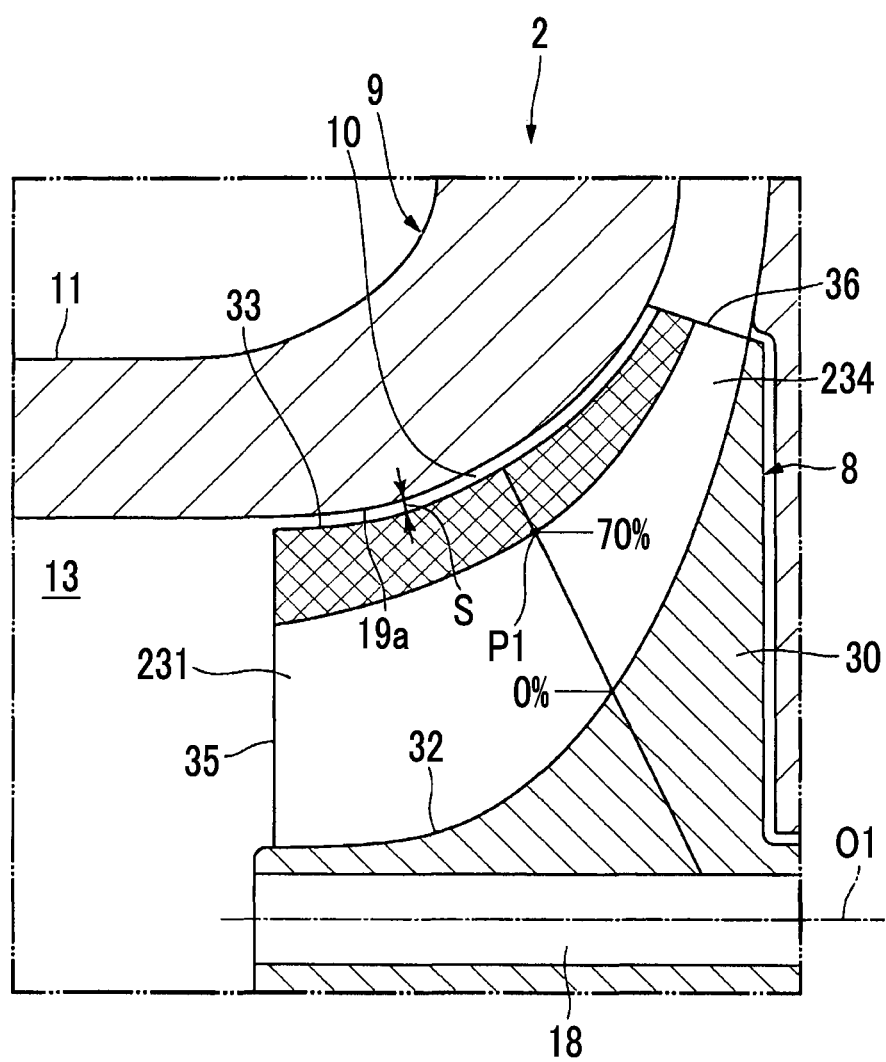
FIG. 9 is a meridian cross sectional view equivalent to FIG. 2 according to a second embodiment of the invention.

FIG. 9 is a meridian cross sectional view equivalent to FIG. 2 according to the second embodiment of the invention.

As illustrated in FIG. 9, a plurality of blades 231 of the second embodiment are formed on the surface 32 facing one side of the disk 30 in the axis O1 direction and are formed at intervals in the circumferential direction of the axis O1, as in the blades 31 of the first embodiment. The blades 231 extend to be separated apart from the disk 30 and are radially disposed about the axis O1.

Each of the blades 231 has the blade end portion 33 disposed with the little gap S between the inner peripheral surface 19a of the turbine wheel accommodating unit 19 and the blade end portion in a direction where the blade 231 extends. The blade end portion 33 is formed to be curved to the outside in the radial direction about the axis O1 as becoming closer from one side to the other side of the rotating shaft 18 in the axis O1 direction. The gap S between the blade end portion 33 and the inner peripheral surface 19a has a fixed size over the entire area in the direction where the blade end portion 33 extends.

The blade 231 includes the clearance flow suppressing blade portion 34 that suppresses a clearance flow flowing from the positive pressure surface 31a to the negative pressure surface 31b of the blade 231 through the gap S. The blade 231 of the second embodiment has a region where a lean angle described above becomes negative in a region having a span height of 70% or more (region shown with shade in FIG. 9). The inflection point P1 of a lean angle of a clearance flow suppressing blade portion 234 of the blade 231 according to the embodiment is disposed in the region having a span height of 70% or more. As in the first embodiment, at the inflection point P1, a lean angle turns over from negative to positive in a direction of separating apart from the blade end portion 33.

Herein, the span height is a span (blade width), that is, a height position in a direction of connecting a position of a % on the blade end portion 33 side in the length direction of a camber line and a position of a % on the surface 32 side of the disk in the length direction of the camber line together. The span height is 0% at the position of the surface 32 of the disk, and is 100% at the position of the blade end portion 33.

According to the second embodiment described above, in a region having a particularly great effect on a clearance flow, in which the span height is 70% or more, a secondary flow can be directed to flow in a direction of reducing a clearance flow. As a result, a clearance flow can be efficiently reduced.

Third Embodiment

Next, a third embodiment of the invention will be described based on the drawings. A case where the clearance flow suppressing blade portion 34 is formed over the entire area of the blade 31 is described in the first embodiment described above. The third embodiment is different from the first embodiment only in that the clearance flow suppressing blade portion 34 is formed in only a part of a region of the blade 31. For this reason, the same portions as those of the first embodiment described above will be assigned with the same reference signs and overlapping description will be omitted.

Figure 10:
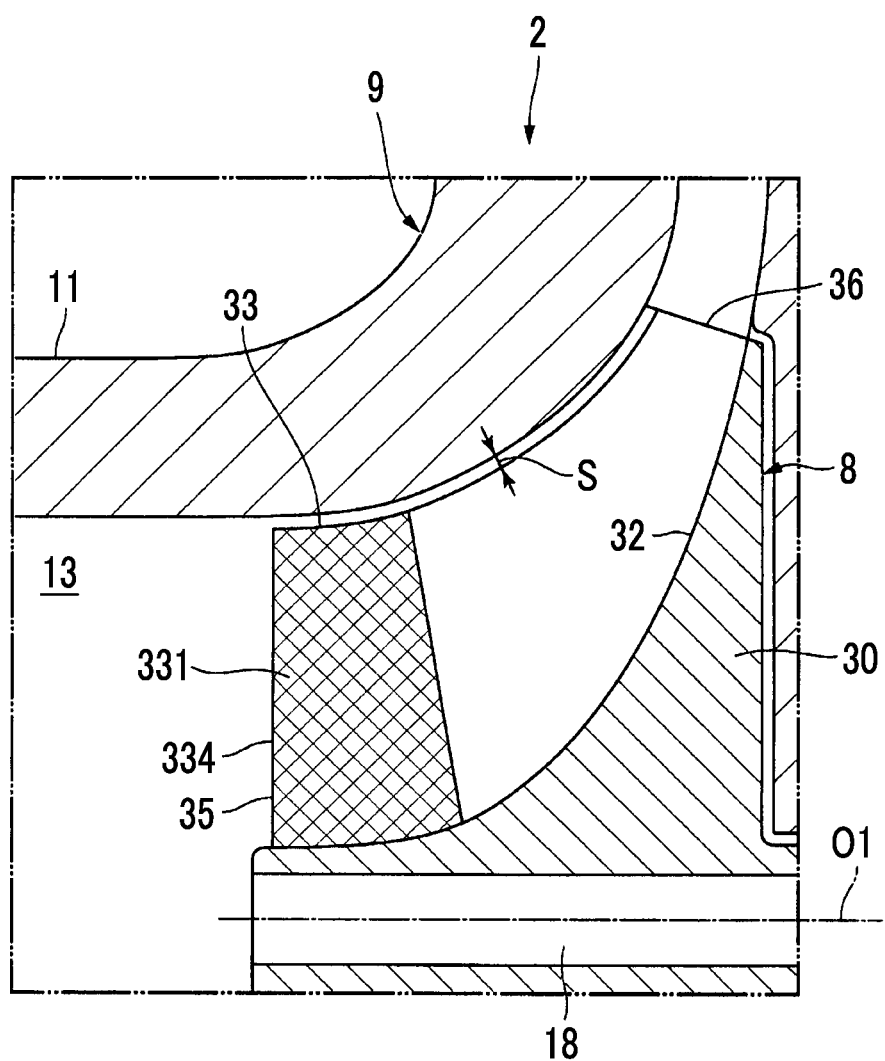
FIG. 10 is a meridian cross sectional view equivalent to FIG. 2 according to a third embodiment of the invention.

FIG. 10 is a meridian cross sectional view equivalent to FIG. 2 according to the third embodiment of the invention.

As illustrated in FIG. 10, a plurality of blades 331 of the third embodiment are formed on the surface 32 facing one side of the disk 30 in the axis O1 direction and are formed at intervals in the circumferential direction of the axis O1, as in the blades 31 of the first embodiment. The blades 331 extend to be separated apart from the disk 30 and are radially disposed about the axis O1.

Each of the blades 331 has the blade end portion 33 disposed with the little gap S between the inner peripheral surface 19a of the turbine wheel accommodating unit 19 and the blade end portion in the direction where the blade 231 extends. The blade end portion 33 is formed to be curved to the outside in the radial direction about the axis O1 as becoming closer from one side to the other side of the rotating shaft 18 in the axis O1 direction. The gap S between the blade end portion 33 and the inner peripheral surface 19a has a fixed size over the entire area in the direction where the blade end portion 33 extends.

The blade 331 includes a clearance flow suppressing blade portion 334 that suppresses a clearance flow flowing from the positive pressure surface 31a to the negative pressure surface 31b of the blade 331 through the gap S. The blade 331 of the third embodiment is partly formed in a direction where a fluid flows from the leading edge 35 to the trailing edge 36 of the blade 331.

More specifically, in the third embodiment, when the leading edge 35 of the blade 331 is set to 0%, the clearance flow suppressing blade portion is formed in a range of 0% to 40% (shown with shade in FIG. 10) toward the trailing edge 36 in the direction where a fluid flows described above. The clearance flow suppressing blade portion 334 is the same configuration as the clearance flow suppressing blade portion 34 of the first embodiment described above, and is formed such that the inflection point P1 of the lean angle, which is located closest to the blade end portion 33 side, turns over from negative to positive in the direction of separating apart from the blade end portion 33.

Therefore, according to the third embodiment described above, a clearance flow can be reduced in a range of 0 to 40%, in which the clearance flow particularly increases, from a leading edge to a trailing edge of a blade. As a result, it is possible to efficiently reduce a clearance flow.

The invention is not limited to each of the embodiments and each of the modification examples described above, and includes various modifications added to each of the embodiments and each of the modification examples described above without departing from the spirit of the invention. That is, specific shapes, configurations, and the like described in each of the embodiments and each of the modification examples are merely examples, and can be modified as appropriate.

For example, a case where the clearance flow suppressing blade portion 334 is provided on a leading edge 35 side in the direction where a fluid flows is described in the third embodiment described above. However, the disposition of the clearance flow suppressing blade portion 334 in the direction where a fluid flows is not limited to the disposition of the modification example of the third embodiment. It is sufficient that the clearance flow suppressing blade portion is formed at least a part between the leading edge and the trailing edge. In addition, the clearance flow suppressing blade portion 334 may be provided in a predetermined area from the trailing edge 36 to the leading edge 35.

A case where the turbocharger is a turbocharger for an automobile is described in each of the embodiments described above. However, the turbocharger is not limited to the turbocharger for an automobile. For example, the turbocharger may be a marine turbocharger. A case where the clearance flow suppressing blade portion is applied to the compressor wheel of the turbocharger is described. However, the clearance flow suppressing blade portion can also be applied to the turbine wheel. In this case, each of the trailing edges 36 of the blades 31, 231, and 331 described above becomes a leading edge, and each of the leading edges 35 becomes a trailing edge.

In addition to the turbocharger, the invention is also applicable to, for example, a rotor blade of a rotary machine such as a gas turbine and a steam turbine. A case where the clearance flow suppressing blade portion is provided in a blade of an impeller of a centrifugal compressor or a radial turbine is given as an example in each of the embodiments described above. However, the clearance flow suppressing blade portion is also applicable to a rotor blade of an axial compressor or an axial turbine.

Each of the embodiments and each of the modification examples described above may be used in combination as appropriate.

INDUSTRIAL APPLICABILITY

The invention is applicable to the rotary machine blade, the turbocharger, and the method for forming a flow field of the rotary machine blade and the turbocharger. According to the invention, it is possible to efficiently reduce a clearance flow without a decrease in performance or an increase in a loss.

REFERENCE SIGNS LIST

1: turbocharger
2: compressor
3: turbine
4: bearing unit
6: engine
7: cylinder
8: compressor wheel
9: compressor housing
10: wheel accommodating unit
11: compressor inlet
12: compressor outlet
13: compressor inlet flow path
14: intake manifold
15: compressor outlet flow path
16: turbine wheel
17: turbine housing
18: rotating shaft
18a: first end portion
18b: second end portion
19: turbine wheel accommodating unit
19a: inner peripheral surface
20: turbine inlet
20a: turbine inlet flow path
21: turbine outlet
21a: turbine outlet flow path
30: disk
31, 231, 331: blade
31a: positive pressure surface
31b: negative pressure surface
32: surface
33: blade end portion
34, 34B, 34C, 34D, 34E, 234, 334: clearance flow suppressing blade portion
35: leading edge
36: trailing edge
37: curved portion
camber line: C1, C1B, C1C, C1D, C1E

The invention claimed is:

1. A rotary machine blade comprising:
a clearance flow suppressing blade portion that includes at least two inflection points at which a lean angle at an intersection point between a camber line in a cross section of the clearance flow suppressing blade portion and an imaginary straight line extending from an axis of rotation in a radial direction and formed therebetween is 0 degree,
wherein,
the clearance flow suppressing blade portion has a positive pressure surface and a negative pressure surface,
the at least two inflection points includes a first inflection point located closest to a blade end,
the lean angle includes a positive lean angle leaning in a direction of the positive pressure surface with respect to the imaginary straight line and a negative lean angle leaning in a direction of the negative pressure surface with respect to the imaginary straight line,
the positive lean angle is formed at the intersection point between the first inflection point and the blade end, and the negative lean angle is formed at the intersection point away from the blade end with respect to the first inflection point,
wherein in the clearance flow suppressing blade portion, the camber line is continuously curved, and the positive lean angle gradually decreases as the intersection point nears from the blade end to the first inflection point.

2. The rotary machine blade according to claim 1, wherein in the clearance flow suppressing blade portion, the negative lean angle gradually increases as becoming closer to an inside in a radial direction from the first inflection point.

3. The rotary machine blade according to claim 1, wherein the first inflection point is formed at least in a region having a span height of 70% or more.

4. The rotary machine blade according to claim 1, wherein the clearance flow suppressing blade portion is formed in at least a part between a leading edge and a trailing edge of a blade.

5. The rotary machine blade according to claim 4, wherein the clearance flow suppressing blade portion is formed in a range of 0 to 40% of a distance from the leading edge to the trailing edge of the blade.

6. The rotary machine blade according to claim 1, further comprising:
a curved portion where at least a part of the negative pressure surface is formed in a recessed shape.

7. The rotary machine blade according to claim 1, wherein the positive pressure surface or the negative pressure surface is formed in a linear shape.

8. The rotary machine blade according to claim 2, wherein the first inflection point is formed at least in a region having a span height of 70% or more.

9. The rotary machine blade according to claim 2, wherein the clearance flow suppressing blade portion is formed in at least a part between a leading edge and a trailing edge of a blade.

10. The rotary machine blade according to claim 2, further comprising:
a curved portion where at least a part of the negative pressure surface is formed in a recessed shape.

11. The rotary machine blade according to claim 3, further comprising:
a curved portion where at least a part of the negative pressure surface is formed in a recessed shape.

12. The rotary machine blade according to claim 4, further comprising:
a curved portion where at least a part of the negative pressure surface is formed in a recessed shape.

13. The rotary machine blade according to claim 5, further comprising:
a curved portion where at least a part of the negative pressure surface is formed in a recessed shape.

* * * * *